US011217797B2

(12) United States Patent
Darga et al.

(10) Patent No.: US 11,217,797 B2
(45) Date of Patent: Jan. 4, 2022

(54) INTERCONNECT FOR FUEL CELL STACK

(71) Applicant: Bloom Energy Corporation, Sunnyvale, CA (US)

(72) Inventors: Daniel Darga, Pleasanton, CA (US); Cheng-Yu Lin, Sunnyvale, CA (US); Vijay Srivatsan, Sunnyvale, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 14/011,804

(22) Filed: Aug. 28, 2013

(65) Prior Publication Data
US 2014/0065508 A1 Mar. 6, 2014

Related U.S. Application Data

(60) Provisional application No. 61/694,337, filed on Aug. 29, 2012, provisional application No. 61/723,992, filed on Nov. 8, 2012.

(51) Int. Cl.
*H01M 8/02* (2016.01)
*H01M 8/026* (2016.01)
(Continued)

(52) U.S. Cl.
CPC ......... *H01M 8/026* (2013.01); *H01M 8/0276* (2013.01); *H01M 8/2425* (2013.01);
(Continued)

(58) Field of Classification Search
CPC ....... H01M 8/0258; H01M 2008/1293; H01M 8/026; H01M 8/2483; H01M 8/2425; H01M 8/0276; Y02E 60/525; Y02E 60/50
(Continued)

(56) References Cited

U.S. PATENT DOCUMENTS 4,135,041 A 1/1979 Jung et al.
4,755,429 A 7/1988 Nickols et al.
(Continued)

FOREIGN PATENT DOCUMENTS

EP 0615299 A1 9/1994
JP 06-215778 8/1994
(Continued)

OTHER PUBLICATIONS

International search report and written opinion received in connection with international application No. PCT/US2013/056949; dated Nov. 8, 2013.
(Continued)

*Primary Examiner* — Jonathan G Jelsma
*Assistant Examiner* — Omar M Kekia
(74) *Attorney, Agent, or Firm* — The Marbury Law Group PLLC

(57) ABSTRACT

Various embodiments include fuel cell interconnects having a fuel distribution portion having an inlet opening, a fuel collection portion having an outlet opening, and a primary fuel flow field containing channels, wherein the fuel distribution portion comprises at least one raised feature defining a fuel distribution flow path, and the fuel distribution flow path is not continuous with the channels in the primary fuel flow field. The at least one raised feature may include, for example, a network of ribs and/or dots. Further embodiments include interconnects having a fuel distribution portion with a variable surface depth to provide variable flow restriction and/or a plenum with variable surface depth and raised a raised relief feature on the cathode side, and/or varying flow channel depths and/or rib heights adjacent a fuel hole.

21 Claims, 14 Drawing Sheets

(51) Int. Cl.
  *H01M 8/2483* (2016.01)
  *H01M 8/0276* (2016.01)
  *H01M 8/2425* (2016.01)
  *H01M 8/124* (2016.01)
  *H01M 8/0258* (2016.01)

(52) U.S. Cl.
  CPC ........ *H01M 8/2483* (2016.02); *H01M 8/0258* (2013.01); *H01M 2008/1293* (2013.01)

(58) Field of Classification Search
  USPC .................................................. 429/457, 458
  See application file for complete search history.

(56) References Cited

U.S. PATENT DOCUMENTS

| | | | |
|---|---|---|---|
| 4,913,982 | A | 4/1990 | Kotchick et al. |
| 5,162,167 | A | 11/1992 | Minh et al. |
| 5,213,910 | A | 5/1993 | Yamada |
| 5,215,946 | A | 6/1993 | Minh |
| 5,248,712 | A | 9/1993 | Takeuchi et al. |
| 5,256,499 | A | 10/1993 | Minh et al. |
| 5,273,837 | A | 12/1993 | Aiken et al. |
| 5,290,642 | A | 3/1994 | Minh et al. |
| 5,342,705 | A | 8/1994 | Minh et al. |
| 5,368,667 | A | 11/1994 | Minh et al. |
| 5,382,315 | A | 1/1995 | Kumar |
| 5,453,331 | A | 9/1995 | Bloom et al. |
| 5,494,700 | A | 2/1996 | Anderson et al. |
| 5,501,914 | A | 3/1996 | Satake et al. |
| 5,518,829 | A | 5/1996 | Satake et al. |
| 5,589,017 | A | 12/1996 | Minh |
| 5,641,585 | A | 6/1997 | Lessing et al. |
| 5,733,499 | A | 3/1998 | Takeuchi et al. |
| 5,955,392 | A | 9/1999 | Takeuchi et al. |
| 6,001,761 | A | 12/1999 | Hata et al. |
| 6,361,892 | B1 | 3/2002 | Ruhl et al. |
| 6,492,053 | B1 | 12/2002 | Donelson et al. |
| 6,582,845 | B2 | 6/2003 | Helfinstine et al. |
| 6,589,681 | B1 | 7/2003 | Yamanis |
| 6,638,575 | B1 | 10/2003 | Chen et al. |
| 6,835,488 | B2 | 12/2004 | Sasahara et al. |
| 7,045,237 | B2 | 5/2006 | Sridhar et al. |
| 8,173,063 | B2 | 5/2012 | Zobl et al. |
| 2002/0012825 | A1 | 1/2002 | Sasahara et al. |
| 2002/0081479 | A1* | 6/2002 | Kantak ............... H01M 8/0228 429/514 |
| 2002/0132156 | A1 | 9/2002 | Ruhl et al. |
| 2003/0170527 | A1 | 9/2003 | Finn et al. |
| 2003/0180602 | A1 | 9/2003 | Finn |
| 2004/0101742 | A1 | 5/2004 | Simpkins et al. |
| 2004/0151973 | A1* | 8/2004 | Rock ................... H01M 8/0247 429/446 |
| 2004/0200187 | A1 | 10/2004 | Warrier et al. |
| 2005/0017055 | A1 | 1/2005 | Kurz et al. |
| 2005/0118489 | A1 | 6/2005 | Frederiksen et al. |
| 2005/0136312 | A1 | 6/2005 | Bourgeois et al. |
| 2005/0227134 | A1 | 10/2005 | Nguyen |
| 2007/0134532 | A1 | 6/2007 | Jacobson et al. |
| 2007/0231676 | A1 | 10/2007 | Cassidy et al. |
| 2008/0070080 | A1 | 3/2008 | Miyazaki |
| 2008/0081223 | A1 | 4/2008 | Yasumoto et al. |
| 2008/0107952 | A1* | 5/2008 | Farrington ............... H01M 8/02 429/434 |
| 2008/0199738 | A1 | 8/2008 | Perry et al. |
| 2009/0162236 | A1* | 6/2009 | Hammond ............ B22F 3/1039 419/19 |
| 2010/0119917 | A1 | 5/2010 | Kumar et al. |
| 2010/0239937 | A1 | 9/2010 | Janousek et al. |
| 2011/0143261 | A1 | 6/2011 | Brandner et al. |
| 2011/0177429 | A1* | 7/2011 | Shiu .................... H01M 8/0258 429/514 |
| 2011/0207018 | A1* | 8/2011 | Nakagawa .......... H01M 8/0258 429/483 |
| 2011/0305969 | A1* | 12/2011 | Song ................... H01M 8/0204 429/467 |
| 2013/0129557 | A1 | 5/2013 | Herchen et al. |
| 2013/0130146 | A1 | 5/2013 | El Batawi et al. |
| 2013/0130152 | A1 | 5/2013 | Couse et al. |
| 2013/0130154 | A1 | 5/2013 | Darga et al. |

FOREIGN PATENT DOCUMENTS

| | | |
|---|---|---|
| JP | 09-199143 | 7/1997 |
| JP | 09-223506 | 8/1997 |
| JP | 09-245810 | 9/1997 |
| JP | 09-245811 | 9/1997 |
| JP | 09-277226 | 10/1997 |
| JP | 2000-281438 | 10/2000 |
| WO | WO2006/016628 A1 | 2/2006 |

OTHER PUBLICATIONS

International preliminary report on patentability received in connection with international application No. PCT/US2013/056949; dated Mar. 12, 2015.
Haynes International High-Temperature Alloys, "Haynes (Reg.) 214 (TM) alloy", 1996, pp. 1-19.
Haynes International High-Temperature Alloys, "Haynes (Reg.) 230(TM) alloy", 2004, pp. 1-27.
International Search Report & Written Opinion, International Application No. PCT/US2007/08224, dated Nov. 26, 2008, 10 pgs.
International Search Report & Written Opinion, International Application No. PCT/US2003/04808, dated Aug. 19, 2003, 9pgs.
Supplementary European Search Report, International Application No. PCT/US2003/04808, dated Jun. 2, 2008, 3pgs.
International Search Report & Written Opinion, International Application No. PCT/US2010/027899, dated Oct. 20, 2010, 11 pgs.
International Preliminary Report on Patentability, International Application No. PCT/US2010/027899, dated Sep. 20, 2011, 6pgs.
"Powder Metallurgy Design Manual," 3rd Edition, copyright Metal Powder Industries Federation, 1998.

* cited by examiner

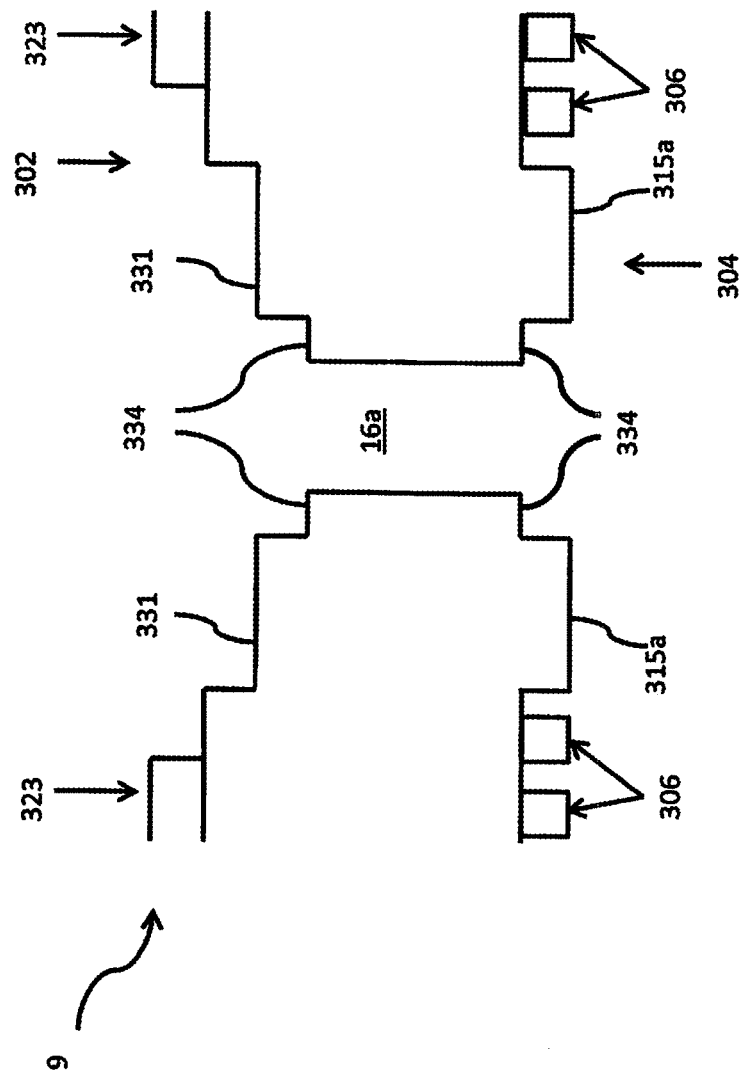

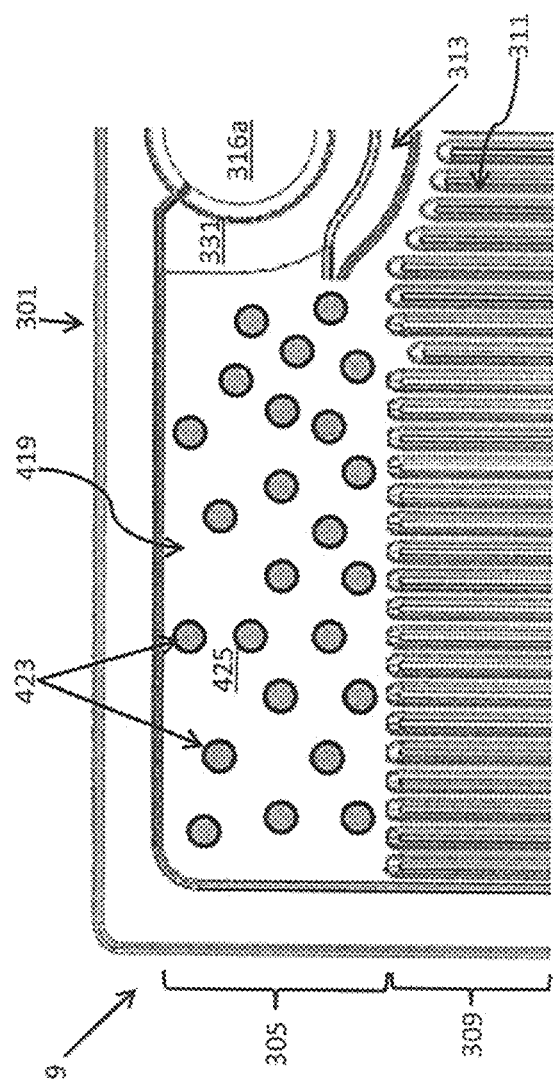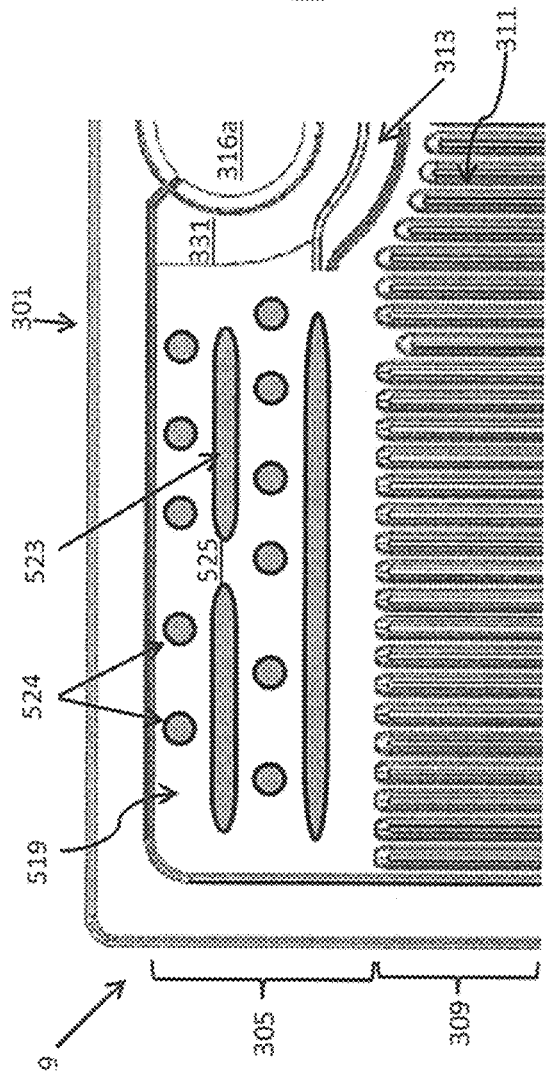

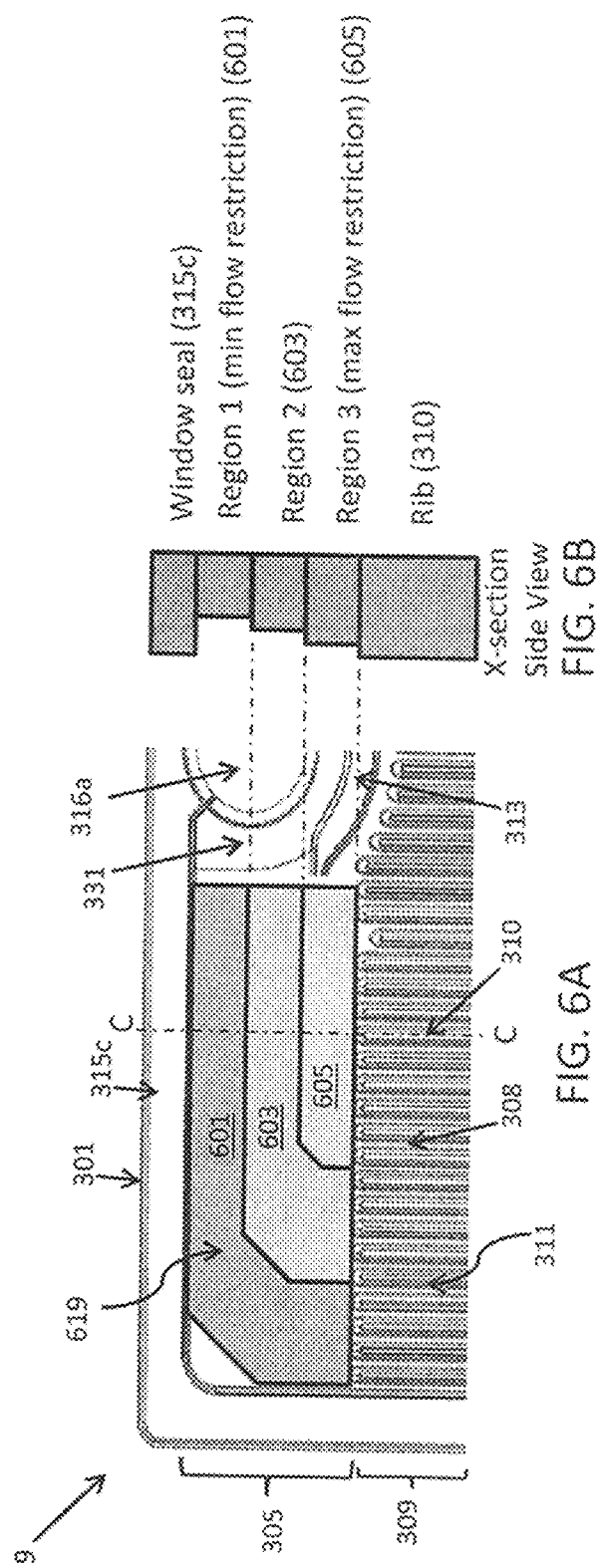

INTERCONNECT FOR FUEL CELL STACK

RELATED APPLICATIONS

This application claims the benefit of priority to U.S. Provisional Application No. 61/694,337, filed Aug. 29, 2012, and to U.S. Provisional Application No. 61/723,992, filed Nov. 8, 2012, the entire contents of which are incorporated herein by reference.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

In order to optimize the operation of SOFCs, the oxidizing and fuel flows should be precisely regulated. Therefore, the flow regulating structures, such as interconnects in the fuel cell system should be precisely manufactured. One type of interconnect currently used is a metal interconnect formed by a powder metallurgy technique. The metal interconnect is typically a chromium-based alloy.

SOFC interconnects (ICs) and endplates require low permeability to keep the air and fuel from mixing, and good topography uniformity (flatness) to ensure that the electrolyte does not experience stress concentrations beyond the breaking strength of the electrolyte. The nature of Powder Metallurgy (PM) manufacturing inherently produces density non-uniformity on parts that have thickness and topography variation in the direction of compaction tonnage. Several compaction methods are already in place to correct for density non-uniformity such as variations in powder fill and compensation on tooling design, however these methods would also cause undesirable topography on the parts.

PM technology creates the shape of a part using three components in a compaction press—the upper punch, the lower punch and a die. The design of the IC necessitates various cross sectional thickness to be molded by features on the punches, i.e., there is cross sectional thickness variation in the direction of compaction tonnage (FIGS. 8A and 8B). This is different from most parts that are processed using PM technology where the punches are typically flat and the die is the component that contains the geometric features, i.e., the cross sectional thickness in the direction of compaction tonnage is uniform (FIGS. 9A and 9B).

As a result of the orientation of the ICs in the compaction process, it is challenging to achieve density uniformity. There are several drawbacks to non-uniform density in compaction. Some drawbacks include certain regions on the IC getting over-densified, therefore increasing tool wear and decreasing tool life; regions that are over-densified undergoing flaking or delamination; and regions with lower density having higher permeability, adversely affecting functionality of ICs in the fuel cell system. There are several standard methods used in the PM industry to achieve density uniformity. However, this is at the cost of high topography variation that causes high stresses on the fuel cell.

SUMMARY

Embodiments include an interconnect for a fuel cell stack that includes a first side comprising a fuel distribution portion, a fuel collection portion and a first plurality of ribs and channels defining a primary fuel flow field between the fuel distribution portion and the fuel collection portion, a fuel inlet opening in the fuel distribution portion and a fuel outlet opening in the fuel collection portion, wherein the fuel distribution portion comprises at least one raised feature defining a fuel distribution flow path, and the fuel distribution flow path is not continuous with the channels in the primary fuel flow field.

The at least one raised feature may include, for example, a network of ribs and/or dots that supports and increases contact area with a fuel cell electrolyte, distributes the fuel to provide more efficient fuel utilization, and enhances the topology and density characteristics of the interconnect.

Further embodiments include an interconnect for a fuel cell stack that includes a first side comprising a fuel distribution portion, a fuel collection portion and a first plurality of ribs and channels defining a primary fuel flow field between the fuel distribution portion and the fuel collection portion, a fuel inlet opening in the fuel distribution portion and a fuel outlet opening in the fuel collection portion, wherein at least one of (i) the first side comprises a plenum, and a second side of the interconnect opposite the first side comprises a raised relief that coincides with the location of substantially the entire plenum, (ii) the first side comprises at least one plenum that extends at least about 60% around the circumference of at least one of the fuel inlet opening and the fuel outlet opening and a flow channel depth in the primary fuel flow field on the first side of the interconnect is greater adjacent to at least one of the fuel inlet opening and the fuel outlet opening than distal from the at least one of the fuel inlet opening and the fuel outlet opening, and (iii) the first side comprises at least one plenum that extends at least about 60% around the circumference of at least one of the fuel inlet opening and the fuel outlet opening and a height of ribs on at least one of the first side and the second side of the interconnect in a portion adjacent to at least one of the fuel inlet opening and the fuel outlet opening is less than the height of the same ribs distal from the at least one of the fuel inlet opening and the fuel outlet opening.

Further embodiments include a method of operating a fuel cell stack that includes flowing fuel from a fuel inlet riser opening along a fuel distribution path defined by at least one raised feature, wherein the direction of the fuel distribution path deviates from the direction of a line between the fuel inlet riser opening and a fuel outlet riser opening by more than 30°, flowing the fuel from the a fuel distribution path through a plurality of parallel channels along a direction that is substantially parallel to the line between the fuel inlet riser opening and the fuel outlet riser opening, wherein the fuel distribution path is not continuous with the parallel channels, and flowing the fuel from the plurality of parallel channels along a fuel collection path defined by at least one raised feature and out the fuel outlet riser opening, wherein the direction of the fuel collection path deviates from the direction of the line between the fuel inlet riser opening and the fuel outlet riser opening by more than 30°.

Further embodiments include fuel cell stacks incorporating an interconnect as described above, as well as methods of fabricating interconnects for a fuel cell stack.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 3C is a cross-sectional illustration of the interconnect of FIG. 3A, viewed along line B-B of FIG. 3A.

FIG. 4 illustrates a portion of an interconnect having raised dots over a fuel distribution portion.

FIG. 5 illustrates a portion of an interconnect having raised dots and ribs over a fuel distribution portion.

FIG. 6A illustrates a portion of an interconnect having varying depths over a fuel distribution portion.

FIG. 6B is a cross-section view of the interconnect of FIG. 6A along line C-C.

DETAILED DESCRIPTION

The various embodiments will be described in detail with reference to the accompanying drawings. The drawings are not necessarily to scale, and are intended to illustrate various features of the invention. Wherever possible, the same reference numbers will be used throughout the drawings to refer to the same or like parts. References made to particular examples and implementations are for illustrative purposes, and are not intended to limit the scope of the invention or the claims.

Various embodiments include interconnects for a fuel cell stack, fuel cell stacks and systems incorporating such interconnects, and methods of fabricating interconnects for a fuel cell stack.

For solid oxide fuel cell stacks, the currently-used interconnects are typically made from an electrically conductive metal material, and may comprise a chromium alloy, such as a Cr—Fe alloy. The interconnects are typically fabricated using a powder metallurgy technique that includes pressing and sintering a Cr—Fe powder, which may be a mixture of Cr and Fe powders, to form a Cr—Fe interconnect in a desired size and shape (e.g., a "net shape" or "near net shape" process). A typical chromium-alloy interconnect comprises more than about 90% chromium by weight, such as about 94-96% (e.g., 95%) chromium by weight. The interconnect may also contain less than about 10% iron by weight, such as about 4-6% (e.g., 5%) iron by weight, may contain less than about 2% by weight, such as about zero to 1% by weight, of other materials, such as yttrium or yttria, as well as residual or unavoidable impurities.

Figure 1:
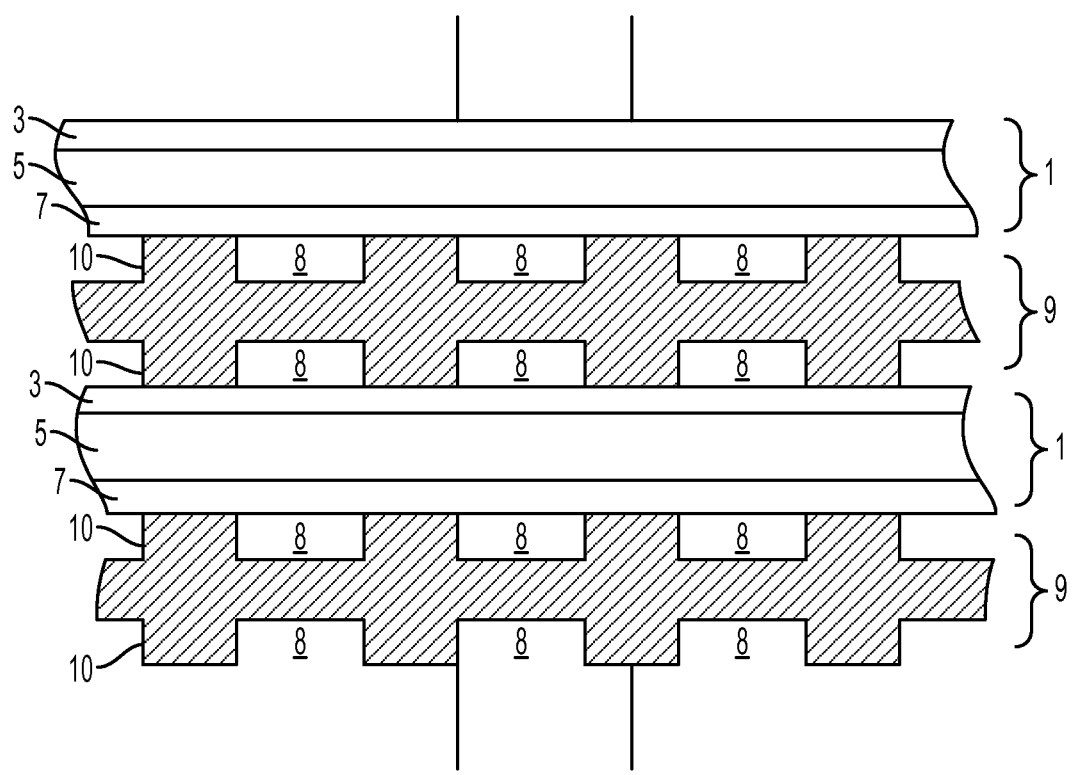
FIG. 1 illustrates a side cross-sectional view of a SOFC stack.

An example of a solid oxide fuel cell (SOFC) stack is illustrated in FIG. 1. Each SOFC 1 comprises a cathode electrode 7, a solid oxide electrolyte 5, and an anode electrode 3. Fuel cell stacks are frequently built from a multiplicity of SOFC's 1 in the form of planar elements, tubes, or other geometries. Fuel and air has to be provided to the electrochemically active surface, which can be large.

The gas flow separator 9 (referred to as a gas flow separator plate when part of a planar stack), containing gas flow passages or channels 8 between ribs 10, separates the individual cells in the stack. Frequently, the gas flow separator plate 9 is also used as an interconnect which electrically connects the anode or fuel electrode 3 of one cell to the cathode or air electrode 7 of the adjacent cell. In this case, the gas flow separator plate which functions as interconnect is made of or contains electrically conductive material. The interconnect/gas flow separator 9 separates fuel, such as a hydrocarbon fuel, flowing to the fuel electrode (i.e. anode 3) of one cell in the stack from oxidant, such as air, flowing to the air electrode (i.e. cathode 7) of an adjacent cell in the stack. At either end of the stack, there may be an air end plate or fuel end plate (not shown) for providing air or fuel, respectively, to the end electrode. FIG. 1 shows that the lower SOFC 1 is located between two interconnects 9.

Figure 2A:
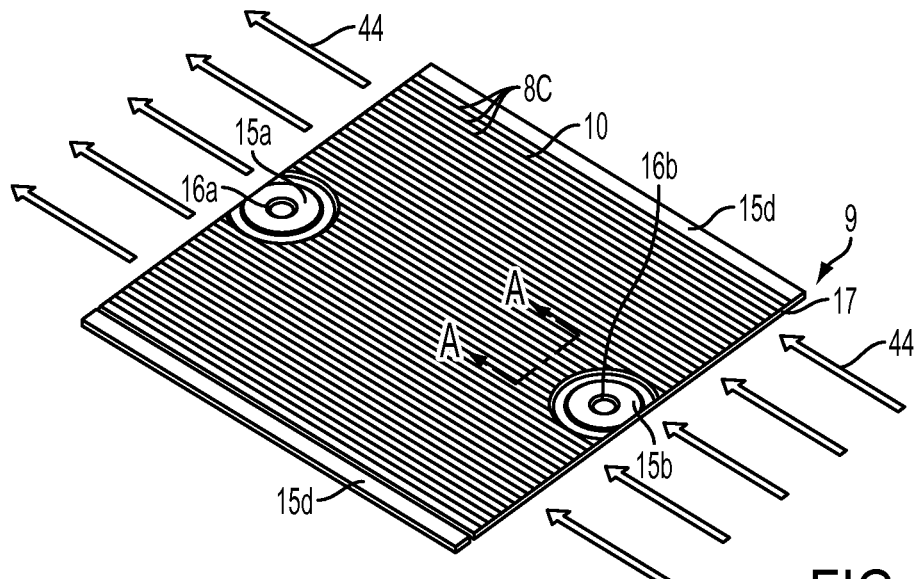
FIG. 2A is a perspective view of a cathode side of an interconnect of the prior art.
Figure 2B:
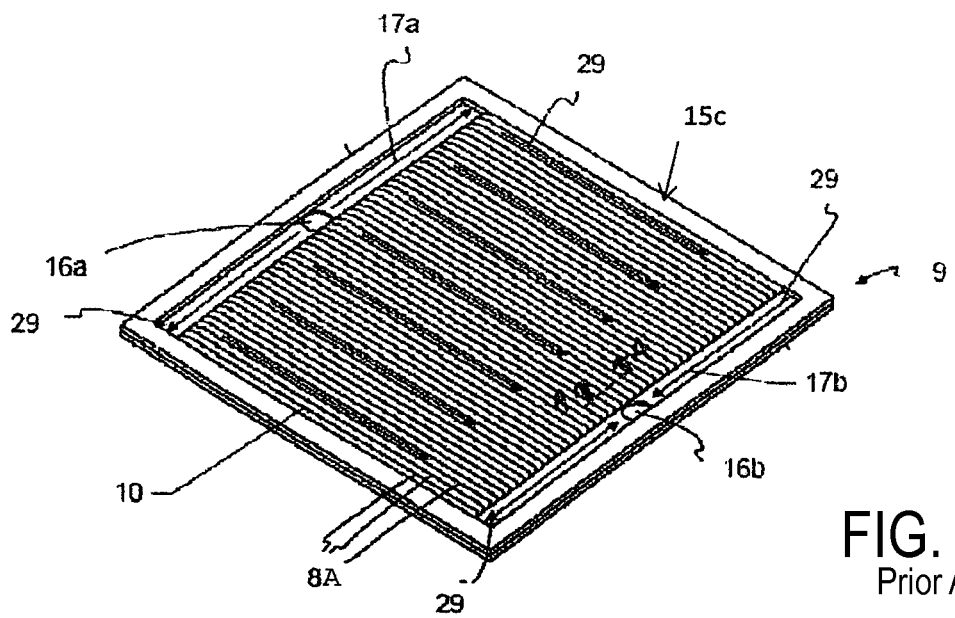
FIG. 2B is a perspective view of an anode side of an interconnect of the prior art.

FIGS. 2A and 2B show, respectively, top and bottom views of a prior art interconnect 9. The portions of interconnect 9 shown in side cross-section in FIG. 1 are provided along lines A-A in FIGS. 2A and 2B. The interconnect 9 contains gas flow passages or channels 8 between ribs 10. The interconnect 9 in this embodiment includes at least one riser channel 16a for providing fuel to the anode-side of the SOFC 1, as illustrated by arrow 29. The riser channel 16a generally comprises a fuel inlet riser opening or hole that extends through at least one layer of the fuel cells and interconnects in the stack. As illustrated in FIG. 2B, the fuel can flow through the inlet riser channel 16a to the anode-side of each fuel cell. There, the fuel can collect in an inlet plenum 17a (e.g., a groove in the interconnect's surface), then flow over the fuel cell anode 3 through gas flow channels 8A formed in the interconnect 9 to an outlet plenum 17b and then exit through a separate outlet riser channel 16b. It should be noted that the ribs 10 may be positioned in any configuration such that the air and fuel can flow on opposite sides of the interconnect 9 in the same direction (co-flow) or in opposite directions (counter-flow) or at right angles to each other (cross flow) or at any angle in between.

The cathode side, illustrated in FIG. 2A, can include gas flow passages or channels 8C between ribs 10 which direct air flow 44 over the cathode electrode of the fuel cell. Seals 15a, 15b can seal the respective risers 16a, 16b on the cathode-side of the interconnect and fuel cell to prevent fuel from reaching the cathode electrode of the fuel cell. The seals may have a circular or hollow cylinder shape as shown so that the risers 16a, 16b extend through the hollow middle part of the respective seals 15a, 15b. The seals 15a, 15b can include an elevated top surface for contacting against the flat surface of the adjacent SOFC 1. A peripheral seal 15c can seal the anode-sides of the interconnect and fuel cell to prevent air from reaching the anode electrode of the fuel cell, and strip seals 15d can seal the edges on the cathode sides.

In FIGS. 2A and 2B, the riser channel openings 16a, 16b are shown as fuel inlet and fuel outlet openings in the interconnect 9. This interconnect is configured for a fuel cell stack which is internally manifolded for fuel, in which the fuel travels through the stack through fuel riser channels which are formed by mated openings through the stacked interconnects and fuel cells. Furthermore, the interconnect 9 shown in FIGS. 2A and 2B is configured for a stack which is externally manifolded for air. However, additional openings through the interconnect may be formed, such as on the left and right sides of the interconnect, for the interconnect to be configured for a stack which is internally manifolded for air.

The functions of an interconnect 9, such as the interconnect 9 shown in FIGS. 1-2B may include, without limitation, a) delivering the anode and cathode reactants uniformly to the active areas of the electrolyte, b) preventing the mixture of the anode and cathode reactants, c) providing structural support of the electrolyte, and d) conducting electricity. To achieve these functions, the interconnect 9 preferably includes fuel and air flowfields that efficiently distribute the reactants over the entire fuel-side and air-side surfaces of the interconnect. The interconnect 9 preferably also possesses low permeability, and provides uniform contact to the active area(s) of the adjacent fuel cells. For interconnects formed by powder metallurgy as discussed above, the uniformity of contact with the adjacent fuel cell is a function of the topography variation throughout the interconnect, and the permeability of the interconnect is a function of the density of the pressed powder interconnect. When powdered metal is compacted with features commonly used in fuel cell interconnect designs, variations in powder density and topography may be introduced due to varying sectional areas found in the design. It is also desirable to achieve the highest densities in regions most sensitive to crossover leaks.

The interconnect 9 illustrated in FIGS. 2A and 2B includes an inlet fuel plenum 17a that very efficiently distributes the fuel from the fuel inlet hole out to the flowfield, and a fuel outlet plenum 17b that collects the excess fuel and reactant products at the outlet and delivers them to the fuel outlet hole. However, these plenums 17a, 17b are relatively wide regions resulting in a reduction of the contact between the interconnect 9 and the adjacent fuel cell by a significant amount. The plenums 17a, 17b are also relatively deep depressions that, due to their relatively small cross-sectional thicknesses, thereby result in the highest density regions of the compressed powder interconnect. The compaction process tends to "bottom-out" when these high-density regions approach 100% dense. The stroke of the compaction press is limited due to these high-density regions being incapable of being compacted further. As a result, the density achieved elsewhere in the part may be less than optimal. This density variation often leads to topography variation, which can reduce the amount of contact the interconnect makes with the adjacent cell.

Another important consideration is in the area of operational efficiency. Maximizing the fuel utilization is important to operational efficiency. Fuel utilization is the ratio of how much fuel is consumed during operation relative to how much is delivered to the cell. Fuel cell operation necessitates avoiding fuel starvation in any region of the active area, which drives the requirement of having appropriately distributed fuel within the flowfield. If there is a maldistribution of fuel such that some flowfield channels receive insufficient fuel to support the fuel cell reaction, this will result in fuel starvation in these channels, and possible irreversible damage to the fuel cell. Therefore, the safe way to avoid fuel starvation is to deliver an excess of fuel, thus hurting operational efficiency. As shown in FIG. 2B, the fuel-side of the interconnect 9 in this example includes parallel channels of equal length. Optimizing fuel utilization in such a design strives for all the channels to run out of fuel simultaneously at the end of the channel. With variations of fuel distribution and current within the active area, this is rarely, if ever, the case.

Figure 3A:
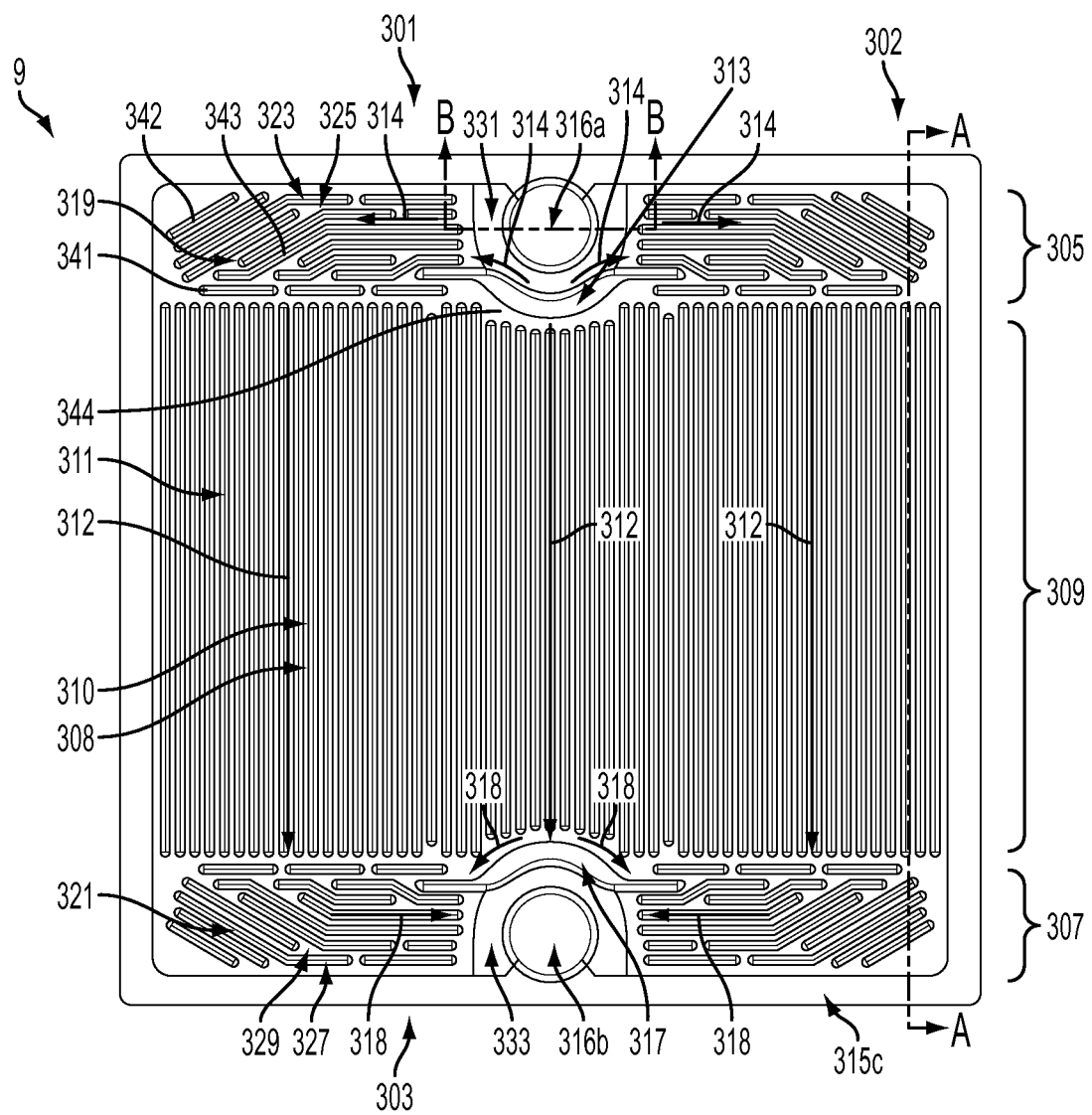
FIG. 3A is a schematic plan illustration of the anode-side of an interconnect according to one embodiment.
Figure 3B:
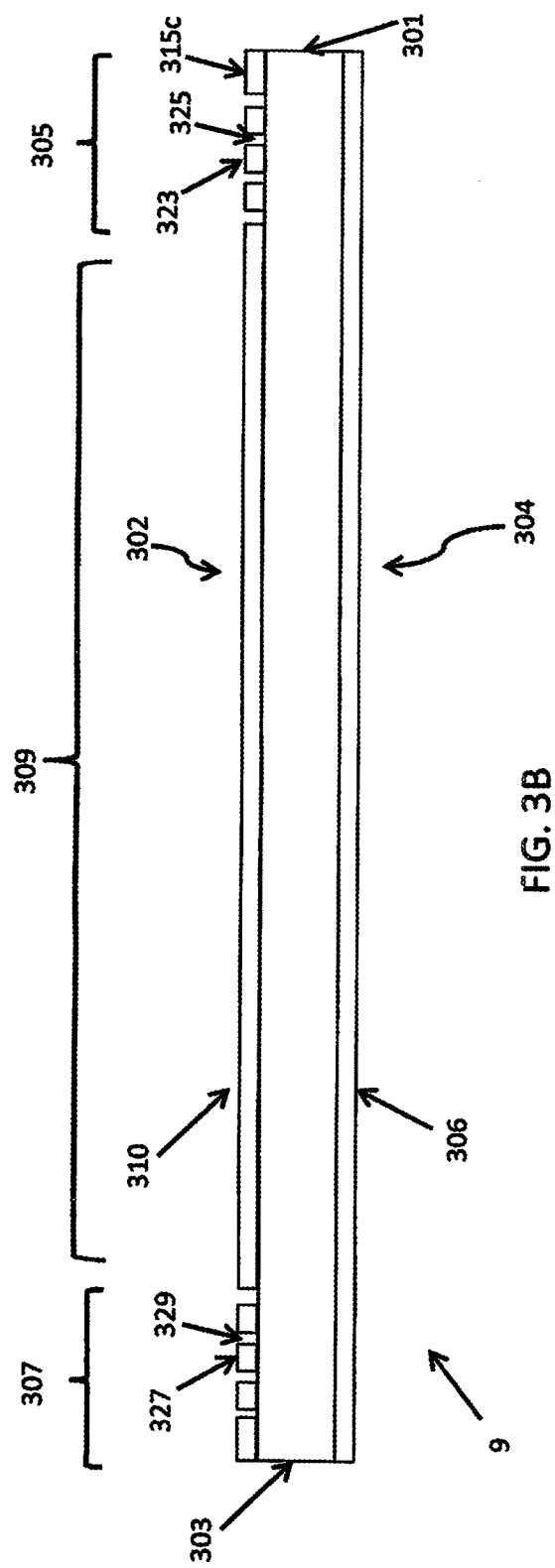
FIG. 3B is a cross-sectional illustration of the interconnect of FIG. 3A, viewed along line A-A of FIG. 3A.

FIGS. 3A-3C illustrate an interconnect 9 having a fuel distribution network that includes a plurality of raised features (e.g., protrusions) according to one embodiment. FIG. 3A is a plan view of the anode (fuel) side 302 of the interconnect 9. The interconnect 9 in this embodiment is a planar interconnect having a first edge 301 and a second edge 303. A fuel distribution portion 305 is proximate the first edge 301 and a fuel collection portion 307 is proximate the second edge 303. A middle portion 309 is located between the fuel distribution portion 305 and the fuel collection portion 307. The middle portion 309 includes a primary fuel flow field 311, which may include a plurality of ribs 310 defining fuel flow channels 308 between the ribs 310. The plurality of fuel flow channels 308 may be parallel to one another and configured to convey fuel over the anode side 302 of the interconnect 9, where the fuel may contact the anode electrode of the adjacent fuel cell in a fuel cell stack. Fuel in the primary flow field 311 may flow in a first direction, indicated by arrows 312, which may be along a substantially straight path between the fuel distribution portion 305 and the fuel collection portion 307. Thus, ribs 310 and channels 308 are preferably straight line shaped. A peripheral seal 315c may seal the anode-side 302 of the interconnect 9 and the adjacent fuel cell to prevent air from reaching the anode electrode of the fuel cell.

The fuel distribution portion 305 includes at least one inlet riser channel opening 316a for providing fuel to the anode-side 302 of the interconnect 9. In the embodiment of FIG. 3A, a raised feature 313 (i.e., blocking rib) is located between the inlet riser channel opening 316a and the entrance to the primary flow field 311. The blocking rib 313 prevents fuel from flowing directly (i.e., in a straight line path) from the inlet riser channel opening 316a into the primary flow field 311 of the interconnect 9. In various embodiments, the blocking rib 313 is configured such that fuel from the inlet riser channel opening 316a must flow in a second direction, indicated by arrows 314, before entering the primary flow field 311, where the second direction deviates by at least 30° (e.g., 45-180°), such as at least 60° (e.g., 90°) from the first direction of fluid flow within the primary flow field 311.

In various embodiments, such as shown in FIG. 3A, the fuel distribution portion 305 of the interconnect 9 may include a fuel distribution flow field 319. The fuel distribution flow field 319 may include, in addition to the blocking rib 313, additional raised features (e.g., protrusions) 323, such as ribs, dots, etc., that define flow paths 325 between the features 323. In the embodiment of FIGS. 3A-3C, the raised features 323 comprise a network of ribs. The raised features 323 and flow paths 325 may be configured to promote substantially uniform fuel utilization and prevent fuel starvation. A relatively large fuel mass flow may be directed to the channels 308 along the periphery of the primary flow field 311 (i.e., along the longest path from the inlet riser channel opening 316a to the primary flow field 311). This is in contrast to prior art designs (such as shown in FIGS. 2A-2B), in which the highest fuel mass flows tend to be within the middle channels of the flow field (i.e., along the shortest path between the fuel inlet and outlet), while the peripheral channels experience the lowest fuel mass flows and highest fuel utilization, resulting in sub-optimal operational efficiency and/or irreversible damage to the adjacent fuel cell due to fuel starvation. In embodiments, the fuel distribution flow field 319 may be configured to promote uniform fuel utilization across the primary flow field 311.

The raised features 323 may be configured such that fuel in the flow paths 325 flow in the second direction, as indicated by arrows 314, over at least a portion of the distribution flow field 319, where the second direction deviates by at least 30° (e.g., 45-180°), such as at least 60° (e.g., 90°), from the first direction indicated by arrows 312, before entering the primary fuel flow field 311. In embodiments, the flow paths 325 in the fuel distribution portion 319 may not be continuous with fuel flow channels 308 in the primary fuel flow field 311, and at least some of the ribs 323, and preferably all of the ribs 323, do not contact the ribs 310 in primary flow field 311.

As shown in FIG. 3A, some of the raised features 323 may be ribs 341 that are oriented generally perpendicular to ribs 310 of the primary flow field 311. A line of such ribs ("peripheral blocking ribs"), with gaps between the ribs, may be located proximate to the entrance to the primary flow field 311 as shown in FIG. 3A. Some of the raised features 323 may be ribs 342 that are oriented diagonally (e.g., at an angle of more than 30° and less than 60°) relative to the ribs 310 of the primary flow field 311. Some of the raised features 323 may be ribs 343 that include at least one portion that is generally perpendicular to the ribs of the primary flow field, and at least one portion that is diagonal to the ribs 310 of the primary flow field 311. As shown in FIG. 3A, there may be a space 344 between the raised features 323, including the blocking rib 313, and the ribs 310 for fuel flow into channels 308.

FIG. 3B is a schematic cross-sectional illustration of an interconnect 9 according to one embodiment, viewed along line A-A in FIG. 3A. FIG. 3B illustrates the anode-side 302 and cathode-side 304 of the interconnect 9, including a rib 310 defining the primary flow field over the middle portion 309 of the anode-side 302 of the interconnect 9, as well as one of the ribs 306 defining the air flow field on the cathode-side 304 of the interconnect 9. FIG. 3B also illustrates a number of raised features 323 (e.g., ribs, shown in cross-section) defining flow paths 325 in the fuel distribution portion 305 of the anode-side 302 of the interconnect 9. As shown in FIG. 3B, the raised features 323 of the fuel distribution portion 305 may have the same height as the ribs 310 in the middle portion 309 of the anode-side 302 of the interconnect 9 to provide a uniform topology for the interconnect 9. The blocking rib 313 may also have the same height as ribs 310 and raised features 323. Thus, the interconnect 9 as shown in FIGS. 3A-3B may provide uniform support to the fuel cell electrolyte, including in the fuel distribution and collection regions, and may avoid unsupported spans, such as present in the plenum regions 17a, 17b of the interconnect shown in FIGS. 2A-2B.

As is also evident from FIG. 3B, the thickness of the interconnect 9 may be generally uniform throughout the fuel distribution portion 305, the fuel collection portion 307 and the middle portion 309. The bottom surfaces of flow paths 325 between features 323 may have the same depth as the bottom surfaces of channels 308 in the primary flow field 311 in area 309 (i.e., bottoms of 323 and 308 are in the same horizontal plane), expect in area 331. In this embodiment, there is no plenum (i.e., depression in the interconnect surface) extending over the fuel distribution and collection portions. The overall density and density distribution of the interconnect 9 may thus be enhanced. The uniformity of the interconnect 9 thickness may be further enhanced providing the respective ribs 310, 306 on the anode-side 302 and cathode-side 304 of the interconnect 9 in an offset configuration, as shown in FIGS. 1B and 3A of U.S. Published Patent Application No. 2008/0199738 to Perry et al., which is incorporated by reference herein in its entirety.

As shown in FIGS. 3A and 3B, the interconnect 9 may include a fuel collection portion 307 that is similar to the fuel distribution portion 305 described above. The fuel collection portion 307 includes at least one outlet riser channel opening 316b for removing excess fuel and reaction products. A raised feature 317 (i.e., blocking rib) is located between the primary flow field 311 and the outlet riser channel opening 316b. The blocking rib 317 prevents fluid from flowing directly (i.e., in a straight line path) from the primary flow field 311 to the outlet riser channel opening 316a. In various embodiments, the blocking rib 317 is configured such that fluid exiting from the primary flow field 311 must flow in a third direction, indicated by arrows 318, before reaching the outlet riser channel opening 316b, where the third direction deviates by at least 30° (e.g., 45-180°), such as at least 60° (e.g., 90°), from the first direction of fluid flow within the primary flow field 311. The third direction may not be the same as the second direction of fluid flow. For example, as shown in FIG. 3A, the unused fuel and reaction products that contact against the blocking rib 317 is initially forced to flow towards the periphery of the interconnect 9, and then must flow approximately 180° in the opposite direction to reach the outlet opening 316b. In general, the first direction is substantially parallel (i.e., within 10°) to a line between the inlet opening 316a and the outlet opening 316b. The second direction and the third direction may be a direction that is not parallel to this line, and deviates from this line by more than 30°.

The fuel collection portion 309 of the interconnect 9 may include a fuel collection flow field 321. The fuel collection flow field 321 may include, in addition to the blocking rib 317, additional raised features (e.g., protrusions) 327, such as ribs, dimples, etc., that define flow paths 329 between the features. The raised features 327 and flow paths 329 may be configured to promote substantially uniform fuel utilization and prevent fuel starvation. The raised features 327 may be configured such that fuel in the flow paths 329 flow in the third direction, as indicated by arrows 318, over at least a portion of the collection flow field 321, where the third direction deviates by at least 30° (e.g., 45-180°), such as at least 60° (e.g., 90°), from the first direction indicated by arrows 312. In embodiments, the flow paths 325 in the fuel collection portion 321 may not be continuous with fuel flow channels 308 in the primary fuel flow field 311, and ribs 327 do not contact ribs 310. As shown in FIG. 3B, the raised features 327 of the fuel collection portion 307 may have the same height as the ribs 310 in middle portion 309 of the anode-side 302 of the interconnect 9 to provide a uniform topology for the interconnect 9. The blocking rib 317 may also have the same height as ribs 310 and raised features 327.

As shown in FIG. 3A, the anode-side 302 of the interconnect 9 may include a depressed area or region 331 surrounding the inlet riser channel opening 316a. This depressed area or region 331 may correspond with an elevated area or region of on the opposite (cathode) side of the interconnect that is used to seal the riser channel against the adjacent fuel cell and prevent the mixing of fuel and air. A similar depressed area or region 333 may surround the outlet riser channel opening 316b. FIG. 3C is a partial cross-section view of the interconnect 9 taken along line B-B that more clearly illustrates the depressed area 331 surrounding the inlet riser channel opening 316a. The depressed area 331 on the anode side 302 of the interconnect 9 may be aligned with and substantially correspond to the flat surface 315a on the opposite (i.e., cathode) side 304 of the interconnect 9. Surface 315a may have a height that is the same as that of the cathode side ribs 306 and may rise above the channels on the cathode side. A fuel hole seal 15a may be later deposited on the flat surface 315a. Since the depressed area 331 on the anode side of the interconnect generally matches the flat surface 315a on the cathode side of the interconnect, the cross-sectional thickness of the interconnect in the area surrounding opening 316a may be relatively uniform with the thickness over the rest of the interconnect, as shown in FIG. 3C. This, areas of relatively low density surrounding the openings 316a, 316b may be avoided, resulting in increased strength and mechanical stability. Also, as shown in FIG. 3C, chamfers 334 may be provided around the fuel riser inlet opening 316a to provide even higher-densities around the riser holes. The chamfers 334 may be provided on the anode- and/or the cathode-side(s) of the interconnect 9, and may be provided around the inlet and/or outlet riser channel openings 316a, 316b.

In an alternative embodiment, the anode-side 302 of the interconnect 9 may include an elevated region 331 surrounding the inlet riser channel opening 316a. This elevated region 331 may correspond with a depressed region on the opposite (cathode) side of the interconnect that is used to seal the riser channel against the adjacent fuel cell and prevent the mixing of fuel and air. A similar elevated area 333 may surround the outlet riser channel opening 316b. In general, if either an elevation or a depression is located one side (anode or cathode side) of the interconnect, then an opposite depression or elevation can be added to the opposite side of the interconnect in order to maintain as constant interconnect cross-sectional thickness as possible. The bottoms of all channels/flow paths may be in the same horizontal plane (except in areas, such as area 331, opposite an elevated area on the other side of the interconnect), and the tops of all protrusions/ribs may be in the same second horizontal plane.

Because the density gradients and lack of support for the electrolyte in prior art systems are primarily driven by the existence of the fuel plenum(s), various embodiments of the invention provide flow field features (e.g., ribs, dots or other raised features/protrusions) in the region(s) previously utilized for the plenum(s). These flow field features may be configured to contact the adjacent fuel cell and provide uniform support to the fuel cell electrolyte in the plenum region. Furthermore, the large density gradients resulting from the plenums (i.e., surface depressions) in prior art interconnects may be avoided.

If the area where the fuel is being distributed is also active, then more fuel must be delivered to the regions where the fuel distribution is occurring. The distribution regions bring the fuel away from the center of the interconnect, and a mechanism is provided by which fuel is directed to flow away from the center, where openings 316a, 316b are located. In embodiments, this may be accomplished by the blocking ribs between the openings. Through the implementation of the blocking rib(s) and distribution and collection flow fields, the following benefits may be gained:

(A) Increased cell efficiency through maximizing rib contact in the cell active area; and (B) Increased stack yields through improved cell structural support by 1) eliminating the unsupported span of the fuel plenum, and 2) improved topography due to more uniform density throughout the interconnect.

FIG. 4 illustrates a portion of an interconnect 9 according to a further embodiment. In this embodiment, the fuel distribution flow field 419 includes raised features in the form of dots 423 (e.g., pillars or bumps having circular, oval or polygonal shape). The dots 423 may support and provide electrical contact with the electrolyte of the adjacent fuel cell, and together with the blocking rib 313, may provide a flow distribution that promotes uniform fuel utilization. Similar features may be provided in the fuel collection flow field. The interconnect 9 may otherwise be identical to the interconnect 9 illustrated in FIGS. 3A-3C. The dots 423 may have a random distribution or may be formed in a pattern (e.g., having a higher density closer to opening 316a and a lower density proximate to the periphery of the flow field).

FIG. 5 illustrates a portion of an interconnect 9 according to a further embodiment. In this embodiment, the fuel distribution flow field 519 includes raised features that include both ribs 523 and dots 524. The ribs 523 and dots 524 may support and provide electrical contact with the electrolyte of the adjacent fuel cell, and together with the blocking rib 313, may provide a flow distribution that promotes uniform fuel utilization. Similar features may be provided in the fuel collection flow field. The interconnect 9 may otherwise be identical to the interconnect 9 illustrated in FIGS. 3A-3C. As shown in FIG. 5, the ribs 523 may be oriented substantially perpendicular to the ribs 310 of the primary flow field 311, although in other embodiments, some or all of the ribs 523 may be diagonal and/or a combination of diagonal and perpendicular ribs. Also, the dots 524 may have a random distribution or may be formed in a pattern (e.g., having a higher density closer to opening 316a and/or primary flow field 311, and a lower density proximate to the periphery of the distribution flow field 519).

FIGS. 6A-6B illustrate a portion of an interconnect 9 according to a further embodiment. FIG. 6A shows a portion of the interconnect 9 in plan view, and FIG. 6B schematically illustrates a cross-section of the interconnect 9 viewed along line C-C. In this embodiment, the fuel distribution flow field 619 includes regions 601, 603, 605 of varying depth to provide varying degrees of flow restriction to the fuel entering through inlet riser channel opening 316a. As shown in FIG. 6B, a first region 601 may have the greatest depth to provide minimal flow restriction. This first region 601 may direct fuel from opening 316a to channels 308 on the periphery of the primary flow field 311. A second region 603 may have an intermediate depth to provide an intermediate flow restriction. The second region 603 may direct fuel from opening 316a to channels 308 between the periphery and middle portions of the primary flow field 311. A third region 605 may have the shallowest depth to provide the greatest flow restriction. The third region 605 may direct fuel from the opening 316*a* to channels 308 in the middle portion of the primary flow field 311. The variation in depth between the different regions 601, 603, 605, which results in a varying degree of flow restriction between the regions, promote uniform fuel utilization. Similar features may be provided in the fuel collection flow field. The interconnect 9 may otherwise be identical to the interconnect 9 illustrated in FIGS. 3A-3C.

It will be understood that the distribution flow field 619 may have more or less than three regions of varying depth. Furthermore, although the regions 601, 603, 605 shown in FIGS. 6A-B have a stepped contour, the variation in depth between the regions may be graduated (e.g., over a curved or sloped surface).

Also, while FIG. 6A illustrates a blocking rib 313 that forces the fuel from opening 316*a* to flow in a lateral direction through the distribution flow field 619 before entering the primary flow field 311, it will be understood that the distribution flow field 619 may provide sufficiently uniform distribution of fuel to the primary fuel flow field 311 without requiring a separate blocking rib 313. One or more of the regions 601, 603, 605 may be generally "L"-shaped having a first segment that extends from the fuel opening 316*a* in a direction that is generally perpendicular to the direction of ribs 310 and then a second segment that extends towards the primary flow field 311 in a direction that is generally parallel to the direction of ribs 310.

Optionally, raised features (e.g., ribs, dots, etc.) may be provided in one or more of regions 601, 603, and 605.

Figure 7A:
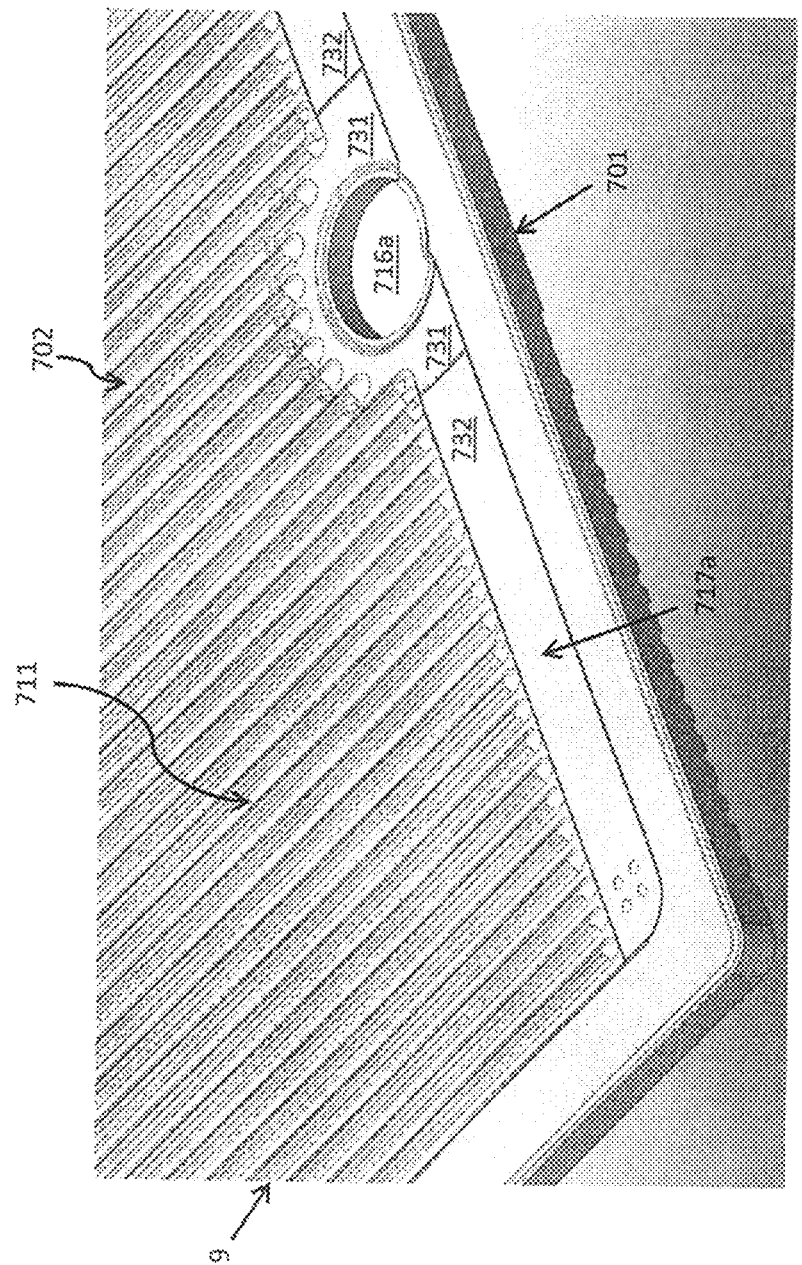
FIG. 7A illustrates a portion of the anode-side of an interconnect having a fuel plenum with a depressed high-density region surrounding the fuel opening.
Figure 7B:
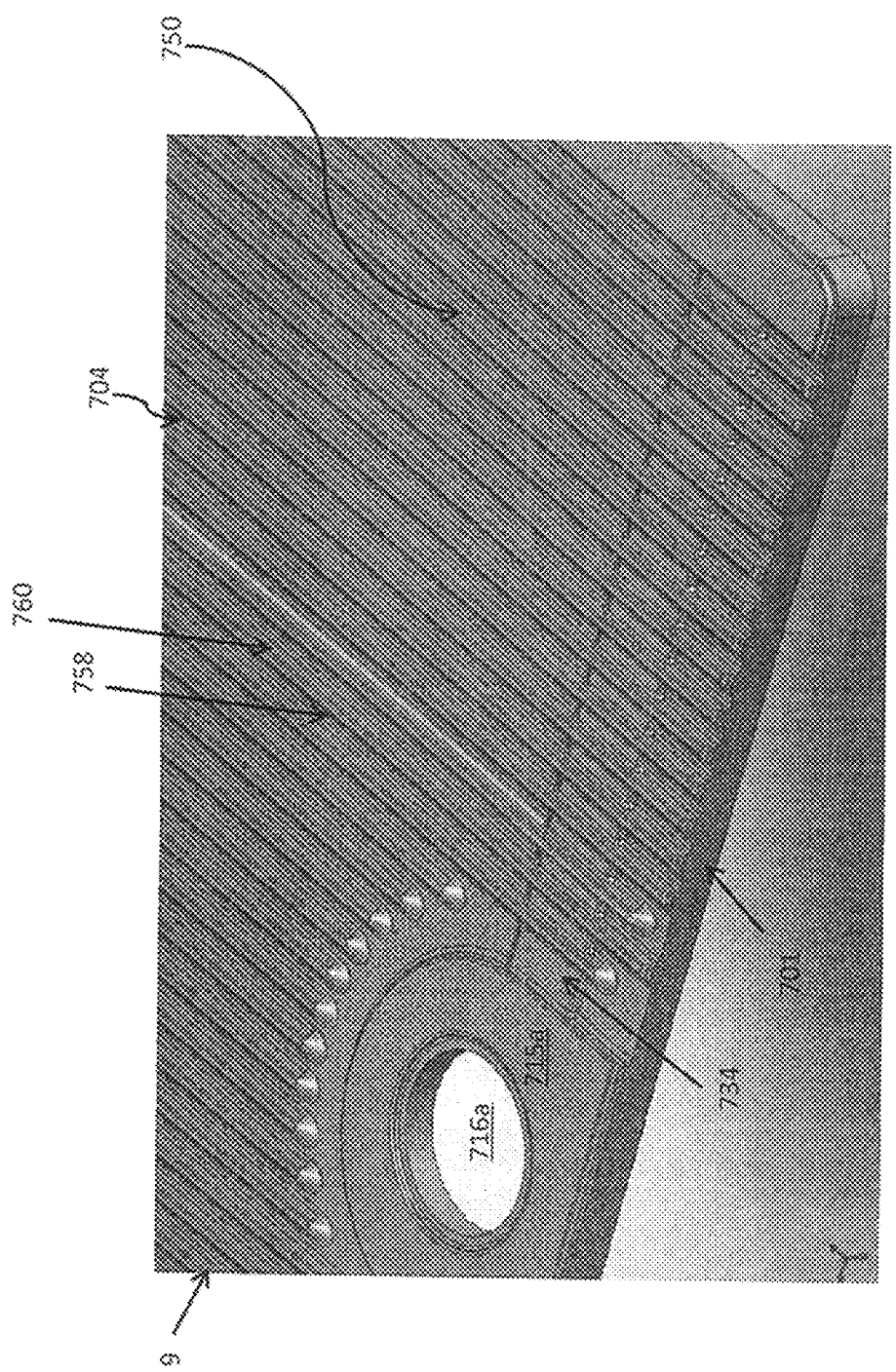
FIG. 7B illustrates a portion of the cathode-side of the interconnect of FIG. 7A having a relief that corresponds with the fuel plenum on the opposite side of the interconnect.
Figure 9A:
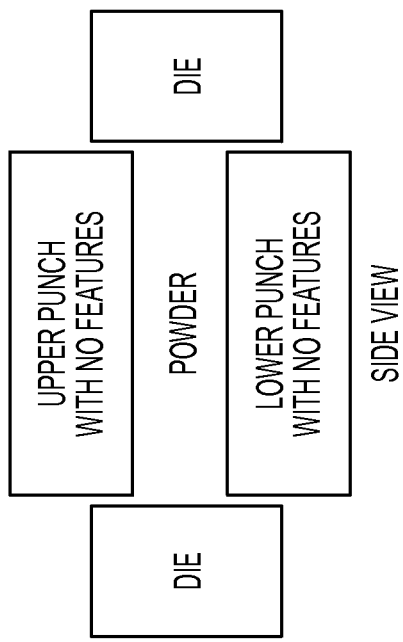
FIGS. 9A and 9B are respective side cross sectional and top views of a prior art PM apparatus.
Figure 9B:
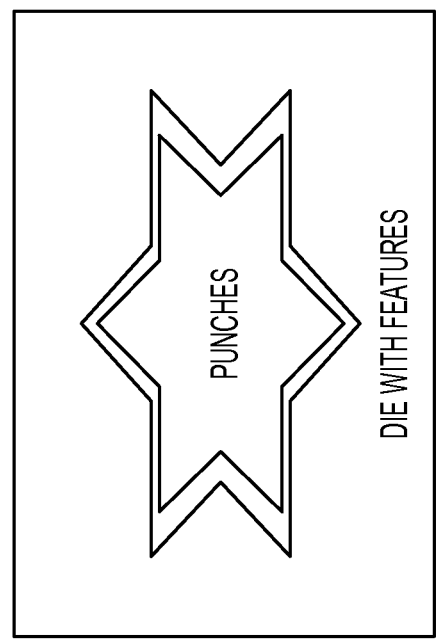
Figure 8A:
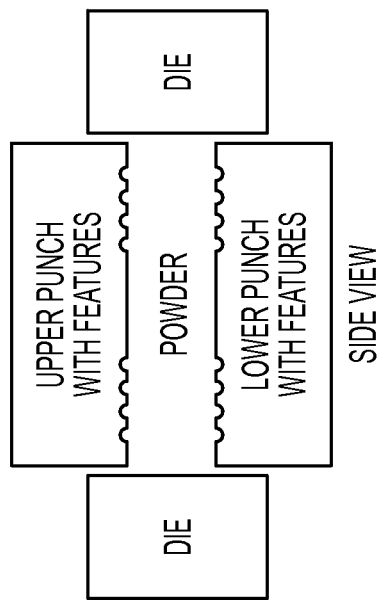
FIGS. 8A and 8B are respective side cross sectional and top views of a prior art powder metallurgy (PM) apparatus for making interconnects.
Figure 8B:
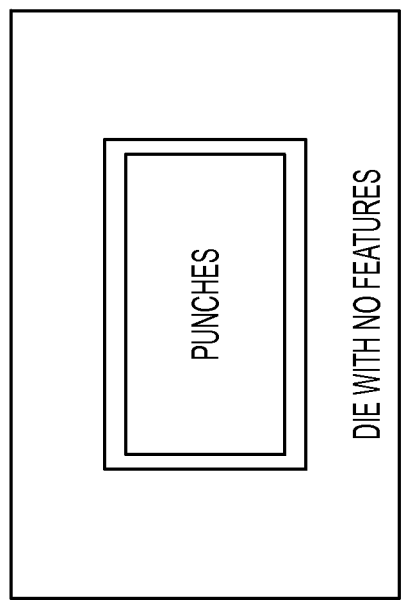

FIGS. 7A-7B illustrate another embodiment of an interconnect 9 for a fuel cell stack. For an interconnect 9 formed by powder metallurgy, it is desirable to achieve the highest densities in regions most sensitive to crossover leaks. Powder metallurgy techniques for increasing density locally are not precise and have proven to only increase variations in density and topography within the interconnect. The design features in the embodiment of FIGS. 7A-7B may help achieve optimal density and topography without the use of these techniques.

As discussed above, prior art interconnects, such as shown in FIGS. 2A-2B, employ a design for distributing fuel throughout the cell that tends to further increase density variation, and unfortunately tends to produce lower density in the region most sensitive to crossover leaks. The fuel plenums (e.g., 17*a*, 17*b* in FIGS. 2A-2B) distribute the fuel from the fuel inlet opening 16*a* out to the flow field at the inlet, and collect the excess fuel and reactant products at the outlet and deliver them to the fuel outlet opening 16*b*. The plenums are relatively wide and deep depressions that drive the density to be the highest in the part due to small cross-sectional areas in this region. As discussed above, the compaction process tends to "bottom-out" when this high density region approaches 100% dense. The stroke of the compaction press is limited due to the high density region being incapable of being compacted further. As a result, the density achieved elsewhere in the part is somewhat predetermined at a lower level by the extent of the compaction stroke. Complicating things, this region of high density is interrupted in the center by flat, elevated regions (e.g., regions below fuel hole seals 15*a*, 15*b* in FIG. 2A; also region 315*a* in FIG. 3C) surrounding the fuel holes on the cathode side of the interconnect. These flat areas are provided for locating a seal (e.g., fuel hole seal 15*a*, 15*b*) that separates the fuel from the air. This flat elevated surface creates a region of large cross-sectional thickness, especially where the elevated surface extends out beyond the fuel plenum on the opposite (fuel) side of the interconnect. A lower than average density is often observed in this region, proving to be the source of failure modes in stacks utilizing interconnects of the prior art. This is the region is where the fuel and the air are in closest proximity, and thus is most sensitive to cross-over leaks.

Powder metallurgy manufacturing techniques have been developed to address some of these density concerns. The local density is determined in large part by the ratio of the thickness of the powder before compaction to the thickness of the final part. If the final part thickness is assumed to be fixed, the density can be adjusted by increasing or decreasing the amount of powder that is compressed into that thickness. The delivery of the powder to the compaction press can be modified to take powder away from one region and add powder to other regions to facilitate higher or lower density. However, for interconnects used in fuel cell stacks, these techniques have proven insufficient to achieve the required density without negative repercussions.

Various embodiments achieve improvements in interconnect density and topography by providing an interconnect having more uniform cross-sectional areas throughout the part. This may be implemented by introducing design features that would be recognized as mildly counter-productive from a functional perspective but achieve much stronger benefits as a result of enabling optimized density and topography.

FIG. 7A is a perspective view of a portion of the anode side 702 of an interconnect 9 according to one embodiment. On the anode side 702, increased density uniformity may be achieved through increasing the density in the region 731 corresponding to the flat elevated region 715*a* surrounding the riser channel opening 716*a* on the cathode side 704 of the interconnect 9, as illustrated in FIG. 7B. It is noted that region 731 is the same feature as 331 in FIGS. 3A, 3C, 4, 5 and 6A but in a plenum 717 rather than in a flow field. The fuel is delivered on the anode side 702 from the fuel opening 716*a* and is distributed throughout the rest of the flowfield 711 by means of the plenum 717*a*. The plenum 717*a* comprises a depressed region in the surface of the interconnect that includes a central region 731 around opening 716*a* having a greater depth than the peripheral regions 732 of the plenum 717*a*. In general, a fuel plenum 717*a* that is deeper in a central region 731 than in the peripheral regions 732 would be recognized as counter-productive toward achieving optimal fuel distribution. It is, however, a relatively weak influence. By implementing a deeper fuel plenum 717*a* in the region 731 directly underneath the elevated surface 715*a* surrounding the fuel opening 716*a* on the cathode side 704, a small sacrifice in achieving fuel distribution (which can be counteracted by other means) can achieve, with great precision, a significant increase in interconnect density where it is needed the most. An identical configuration may be provided in the fuel collection portion of the interconnect 9.

FIG. 7B is a perspective view of the cathode side 704 of the interconnect 9 shown in FIG. 7A. On the cathode side 704, increased density uniformity may be achieved through an increase in cross-sectional thickness in a raised portion or relief 734 that corresponds to the fuel plenum 717*a* on the anode side 702 of the interconnect (i.e., a plenum relief). Air enters into the cathode flowfield 750 through the channels 758 defined by ribs 760 that extend to the first edge 701 of the interconnect 9, and it travels down the channels 758 until it exits the interconnect 9 at the second edge (not shown) (i.e., for an interconnect that is internally manifolded for fuel and externally manifolded for air). The plenum relief 734 will produce some flow restriction as the air enters the cathode flow field 750 (i.e., the air side channel 758 depth is smaller over the plenums on the fuel side of the interconnect than over the primary flow field 711 on the fuel side of the interconnect). In general, features that restrict the flow of air are counter-productive. However, restrictions that act over a relatively short distance are a weak influence. By introducing a plenum relief 734 that elevates the bottom surface of the airflow channels 758 in the region directly over the anode fuel plenum 717*a*, a small sacrifice in air flow restriction (which can be counteracted by other means) can achieve, with great precision, a design that delays the point at which the compaction press bottoms-out, increasing the stroke length of the press, and thereby increasing the density throughout the rest of the part. An identical design may be employed at the opposite end of the interconnect 9, with a plenum relief 734 corresponding to the fuel collection plenum on the anode side of the interconnect. In various embodiments, the plenum relief 734 may be located over substantially the entire plenum 717*a* on the anode side of the interconnect, which as used herein may be at least about 75% (e.g., 85-90%), including 95-100% of the area of the plenum 717*a*.

The fuel plenum relief 734 on the cathode-side 704 of the interconnect 9 and the depression 731 surrounding the fuel opening on the anode-side 702 of the interconnect 9 are both features which would generally be recognized as counter-productive. However, in the context of design for manufacturing, these features may produce benefits that outweigh the costs. These features may allow for more uniform contact between the interconnect and the electrolyte while maintaining required density levels and a more uniform interconnect thickness in different regions. Conversely, these features may allow for increased density without increasing the topography variation. These designs may provide improved yields and increased reliability, and may be advantageously used in single press powder metallurgy techniques.

Further embodiments provide design improvements on the interconnect and endplates. In one embodiment, the channel 8 depth on the fuel (anode) side of the IC (see FIGS. 1-2B) is greater adjacent to the fuel inlet and/or outlet riser opening(s) 16*a*, 16*b* than distal from the fuel riser opening to account for cross sectional thickness difference due to the existence of region 315*a* (i.e., a flat surface around riser openings 16*a*, 16*b* on which seals 15*a*, 15*b* sit) on the corresponding air (cathode) side of the interconnect 9. In other words, channel 8 depth on the anode side is greater over region 315*a* on the cathode side than over ribs 760 on the cathode side of the interconnect 9).

In an additional embodiment, the height of ribs 10 on at least one of the fuel and/or air side of the interconnect 9 in a portion adjacent to the fuel inlet and/or outlet riser opening(s) 16*a*, 16*b* is less than the height of the same ribs distal from the fuel riser opening. Specifically, tips on the ribs around the opening(s) 16*a*, 16*b* on both air and fuel sides of the interconnect 9 are omitted or removed to counter high topography as a result of density non-uniformity caused by the region 315*a* (i.e., flat surface on which seals 15*a*, 15*b* sit). These embodiment interconnect configurations may be used alone or in combination with each other to help achieve better density uniformity while decreasing the resultant topography variation. Either or both of these embodiment interconnect configurations may also be used in combination with any of the embodiments previously described in this application.

Figure 10A:
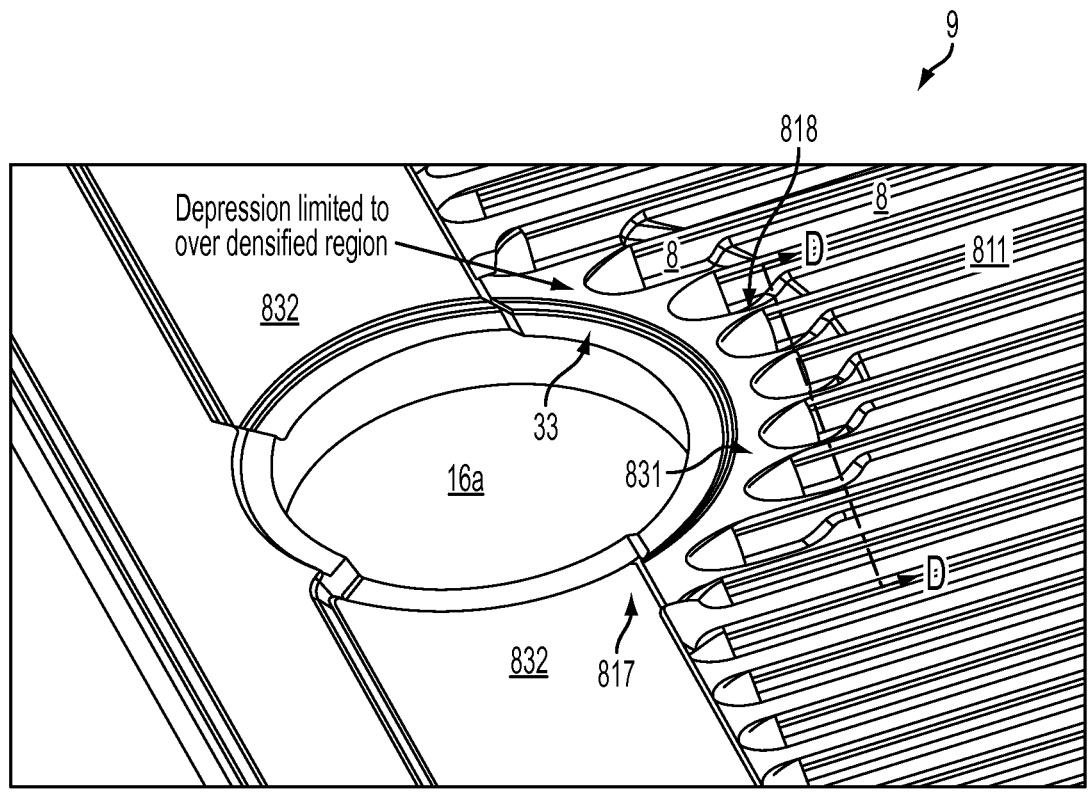
FIG. 10A is a partial perspective view of a fuel side of an interconnect in which the fuel flow channel depth is greater adjacent to the fuel inlet and/or outlet riser opening(s) than distal from the fuel riser opening.

FIG. 10A is a perspective view of a portion of the anode side of an interconnect 9 according to one embodiment. The fuel is delivered on the anode side from the fuel opening 16*a* and is distributed throughout the rest of the primary flow-field 811 by means of the plenum 817*a*. An identical configuration may be provided in the fuel collection portion of the interconnect 9 (not shown in FIG. 10A). The plenum 817*a* comprises a depressed region in the surface of the interconnect that may extend at least about 60% around the circumference of the riser channel opening 16*a*, such as at least about 90%, and in some embodiments entirely around the circumference of the riser channel opening 16*a*. In a non-limiting example shown in FIG. 10A, the plenum 817 may include a first portion 831 having a greater depth than one or more second portion(s) 832 of the plenum 817*a*. As shown in FIG. 10A, the first (deeper) portion 831 of the plenum 817*a* may encompass a roughly semi-circular or semi-oval region that curves around the riser channel opening 16*a* adjacent to the primary flowfield 811, and the second portion 832 may be adjacent to the periphery of the riser channel opening 16*a*. In other embodiments, the first (deeper) portion 831 may also extend around the periphery of the riser channel opening 16*a*, as shown in FIGS. 7A-B. In other embodiments, the entire plenum 817*a* may have a uniform depth.

As shown in FIG. 10A, an additional depressed region 818 may extend into the primary flowfield 811 on the fuel side of the interconnect 9. The additional depressed region 818 may be contiguous with the plenum 817*a*, and may have the same depth as at least a portion of the plenum (e.g., the first portion 831 of the plenum 817*a*, as shown in FIG. 10A). The depressed region 818 may encompass a roughly semi-circular or semi-oval portion of the flowfield 811 which curves around the opening 16*a* and first portion 831 of the plenum 817. The shape of the depressed region 818 may correspond with at least a portion of the elevated surface 315*a* surrounding the riser channel opening 16*a* on the opposing (air/cathode) side of the interconnect. The depressed region 818 of the flowfield 811 results in a greater channel 8 depth in the depressed region 818 than in the remainder of the primary flowfield 811. Thus, the depth of the flow channels 8 adjacent to the fuel inlet and/or outlet riser opening(s) 16*a*, 16*b* (i.e., within depressed region 818 over surface 315*a*) may be greater than the depth of those same channels 8 or different channels distal from the riser opening(s) 16*a*, 16*b* (i.e., outside of depressed region 818 and not over surface 315*a* on the cathode side of the interconnect).

Figure 10B:
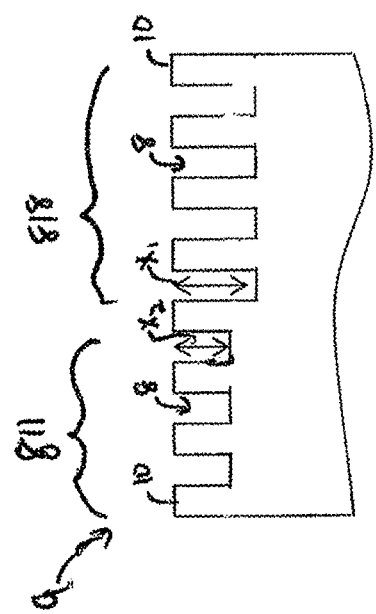
FIG. 10B is a partial cross-sectional view of an interconnect taken along line D-D in FIG. 10A.

This is illustrated schematically in FIG. 10B, which is a cross-sectional view of an interconnect 9 taken along line D-D in FIG. 10A. The channels 8 in the depressed region 818 have a first depth, $X_1$, that is greater than the depth $X_2$ of the channels 8 in the rest of the flowfield 811.

The configuration of FIGS. 10A-B may allow more uniform interconnect density and reduced topography variation on the rib 10 tips around the openings 16*a*, 16*b*. Thus, the regions 818, 817 of relatively deeper depression may be located only in the region that requires increased densification without affecting the functionality of the fuel cell stack. The regions 818, 817 may cover an insignificantly small region of the interconnect 9 that will not affect flow characteristics due to fuel cell stack operation at low Reynolds' numbers. This design modification specifically targets an area that is functionally sensitive to the fuel cell stack operation to increase interconnect density and avoid fuel permeating through the flat region 315*a* to the seal surfaces.

Embodiments may also include chamfers 33 around the fuel riser opening(s) 16a, 16b to provide even higher-densities around the riser holes, as shown in FIG. 10A. The chamfer 33 may provide a lower thickness region around the riser opening 16a than in surrounding areas. The chamfer 33 can be provided on the anode- and/or the cathode-side(s) of the interconnect 9.

Figure 11A:
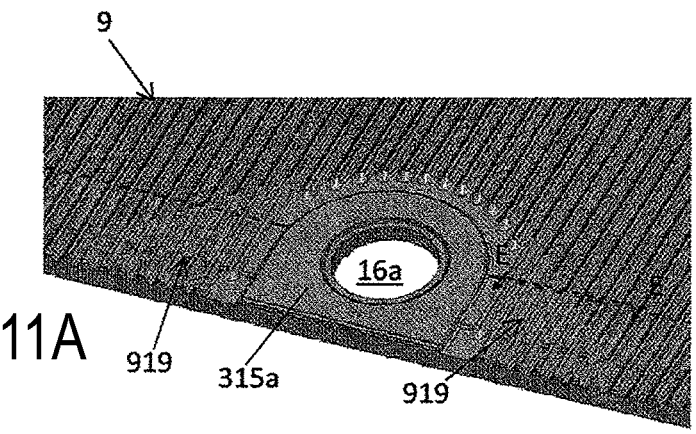
FIGS. 11A-B are partial perspective views of a cathode side of an interconnect in which the height of ribs in a portion adjacent to the riser channel opening is less than the height of the ribs distal from the riser channel opening.
Figure 11B:
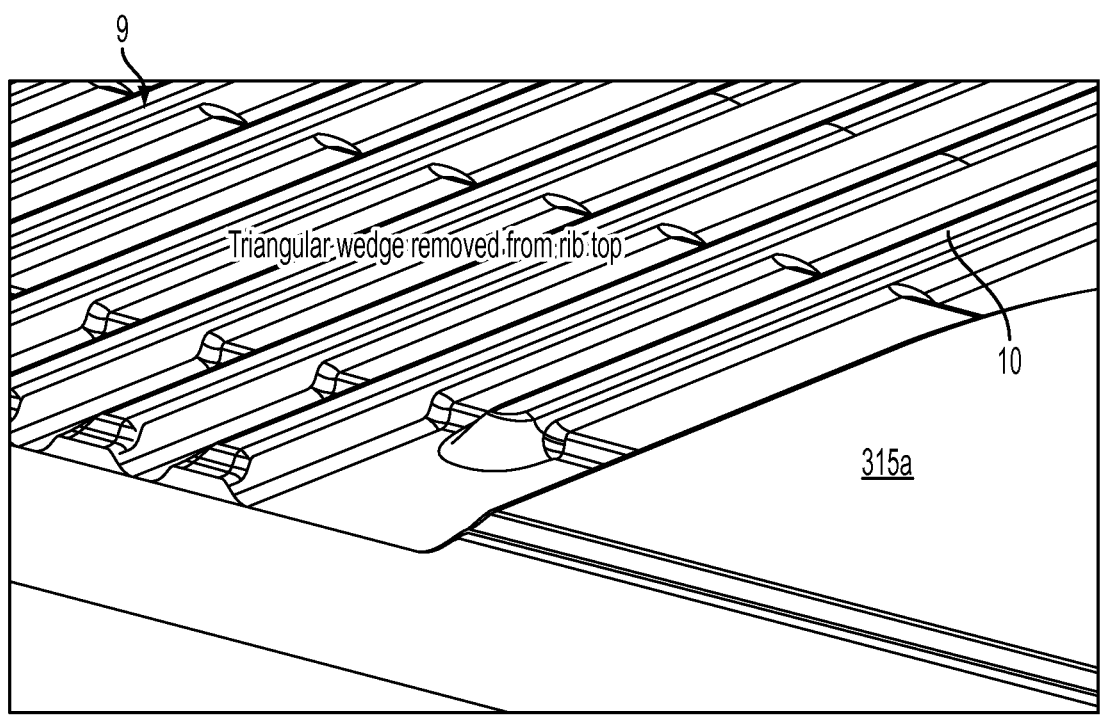
Figure 11C:
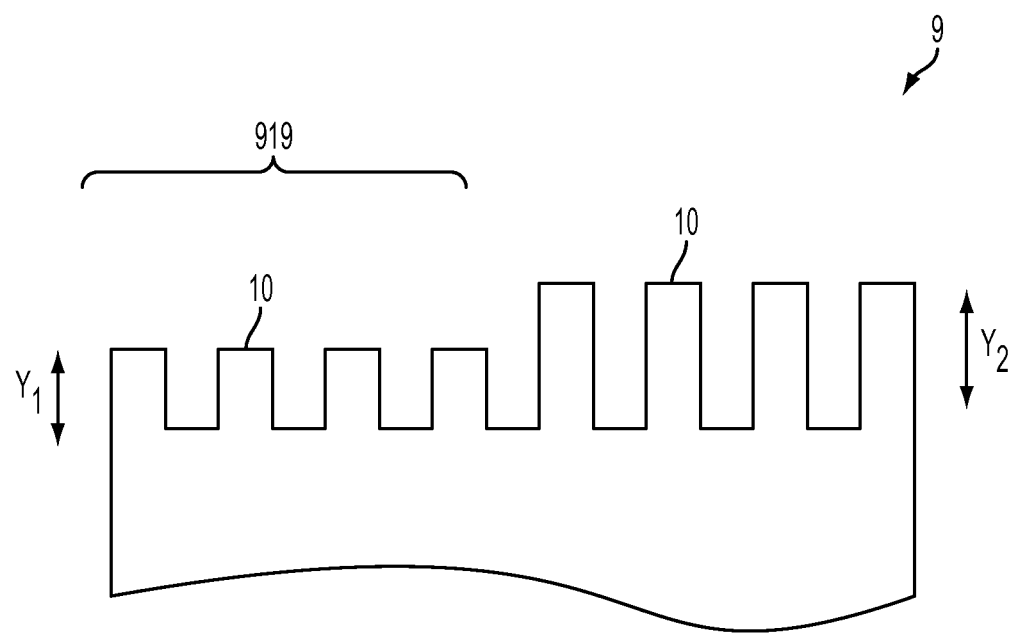
FIG. 11C is a partial cross-sectional view of an interconnect taken along line E-E in FIG. 11A.

FIGS. 11A-B are partial perspective views of an air (cathode) side of an interconnect 9 according to a further embodiment in which the height of ribs 10 on at least one of the fuel and/or air side of the IC in a region 919 adjacent to the fuel inlet and/or outlet riser opening(s) 16a, 16b is less than the height of the same ribs and other ribs distal from the fuel riser opening outside of the region 919. Specifically, tips on the ribs 10 around the opening(s) 16a, 16b on both air and fuel sides of the IC may be omitted or removed to counter high topography as a result of density non-uniformity caused by the elevated region 315a surrounding the riser openings 16a, 16b. This is illustrated schematically in FIG. 11C, which is a cross-sectional view of an interconnect 9 taken along line E-E in FIG. 11A. The ribs 10 in region 919 have a first height $Y_1$ that is less than the height $Y_2$ of the ribs 10 outside of the region 919 (which the bottoms of the channels 8 between the ribs have the same depth/are located in the same plane).

As stated earlier, over-densification and compaction methods used to avoid over-densification both cause higher topography variation, especially around regions with high density variation such as the region including and surrounding the flat regions 315a. These topography variations typically manifest themselves in the form of higher rib tips on both the air and fuel sides. In this embodiment, the height of the portions of the rib 10 tips on one or both of the air and the fuel sides of the interconnect 9 in a region 919 adjacent to the opening(s) 16a, 16b is reduced compared to the height of the ribs outside region 919 in order to compensate for the added height during the compaction process. Region 919 may correspond to the same area as the depression 817 on the fuel side (see FIG. 10A) or it may cover a differently sized area.

In one non-limiting configuration, the magnitude of the rib height reduction may be largest closest to the D-Flat region 932, and may get progressively smaller the farther away from the flat region 315a (e.g., starting at the flat region 315a under seal 15a and then varying to the left and to right in FIG. 11A). The height reduction may be determined empirically through monitoring the heights during compaction and making an adjustment in the model for the tool. The resultant interconnect may therefore be flat with minimal topography variation.

Alternatively or in addition, the ribs 10 may have a tapered height in region 919 (i.e., increasing in direction away from the edge 920 of the IC and/or from opening 16a) versus a constant rib height outside region 919.

While solid oxide fuel cell interconnects and electrolytes are described above in various embodiments, embodiments can include any other fuel cell interconnects, such as molten carbonate, phosphoric acid or PEM fuel cell interconnects, or any other shaped metal or metal alloy or compacted metal powder or ceramic objects not associated with fuel cell systems.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step or component of any embodiment described herein can be used in any other embodiment.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. An interconnect for a fuel cell stack, comprising:
a first-side comprising:
a primary flow field comprising fuel ribs that at least partially define fuel channels;
a fuel distribution portion configured to distribute fuel to first ends of fuel channels; and
a fuel collection portion configured to receive fuel from second ends of the fuel channels;
a fuel inlet opening in the fuel distribution portion; and
a fuel outlet opening in the fuel collection portion,
wherein:
the fuel channels extend in a first direction from the fuel distribution portion to the fuel collection portion;
the fuel distribution portion comprises a blocking rib disposed between the fuel inlet opening and the primary flow field;
the blocking rib does not contact the fuel ribs;
the blocking rib is configured to simultaneously direct fuel received from the fuel inlet opening toward two opposing edges of the interconnect in opposing second and third directions to define a fuel distribution flow path, wherein the fuel distribution flow path is not continuous with the fuel channels in the primary fuel flow field; and
the fuel distribution portion is configured to distribute fuel such that a larger fuel mass flow is directed to fuel channels extending along the periphery of the primary flow field than to fuel channels extending through the middle of the primary flow field.

2. The interconnect of claim 1, wherein the second and the third directions are substantially perpendicular to the first direction.

3. The interconnect of claim 1, wherein the interconnect comprises a second side opposing the first side, the second side comprising air channels that extend in a direction substantially parallel to the first direction, from a first outer edge of the interconnect to a second opposing outer edge of the interconnect.

4. The interconnect of claim 3, wherein:
the fuel inlet opening is disposed in the middle of the fuel distribution portion; and
the fuel outlet opening is disposed in the middle of the fuel collection portion.

5. The interconnect of claim 1, wherein the fuel distribution portion comprises distribution ribs that do not contact the fuel ribs or the blocking rib.

6. The interconnect of claim 1, wherein the fuel distribution portion comprises raised dots that do not contact the fuel ribs or the blocking rib.

7. The interconnect of claim 1, wherein the fuel distribution portion comprises at least one rib and at least one dot, which do not contact the fuel ribs or the blocking rib.

8. The interconnect of claim 1, wherein a cross-sectional thickness of the interconnect is substantially uniform between the fuel distribution portion and the primary fluid flow field.

9. The interconnect of claim 1, wherein the height of the blocking rib is substantially equal to the height of the fuel ribs.

10. The interconnect of claim 1, further comprising:
a depressed region surrounding the fuel inlet opening that corresponds with an elevated region on a second side of the interconnect, opposite the first side; or
an elevated region surrounding the fuel inlet opening that corresponds with a depressed region on the second side of the interconnect.

11. The interconnect of claim 1, wherein the fuel collection portion comprises a second blocking rib that does not contact the fuel ribs and is disposed between the fuel outlet opening and the primary flow field, the second blocking rib being configured to simultaneously direct fuel and reactants products received from the second ends of adjacent fuel channels towards the two opposing edges of the interconnect.

12. The interconnect of claim 11, wherein the fuel collection portion comprises ribs or raised dots that are configured such that fuel exiting the second ends of adjacent fuel channels is prevented from flowing in a straight line path to the fuel outlet opening.

13. The interconnect of claim 11, wherein the fuel collection portion comprises ribs and raised dots that have a height that is substantially equal to the height of the fuel ribs and the second barrier rib.

14. The interconnect of claim 11, wherein a cross-sectional thickness of the interconnect is substantially uniform between the fuel distribution portion, the fuel collection portion and the primary fluid flow field.

15. The interconnect of claim 11, further comprising a depressed area surrounding the fuel outlet opening that corresponds with an elevated region on a second side of the interconnect, opposite the first side.

16. The interconnect of claim 1, wherein the interconnect is formed by powder metallurgy.

17. The interconnect of claim 16, wherein the interconnect comprises chromium and iron.

18. The interconnect of claim 1, wherein a surface depth of the fuel distribution portion varies to form a stepped structure, with each step of the stepped structure providing a different amount of fuel flow restriction.

19. The interconnect of claim 18, wherein:
a portion of the fuel distribution portion having the least amount of fuel flow restriction directs fuel to the fuel channels extending along the periphery of the primary flow field; and
a portion of the fuel distribution portion having the greatest amount of fuel flow restriction directs fuel to the fuel channels extending through the middle of the primary flow field.

20. The interconnect of claim 1, wherein a surface depth of the fuel distribution portion is curved or sloped, such that a relatively small fuel mass flow is directed into the fuel channels in the central region of the primary flow field, and a relatively large fuel mass flow is directed into the fuel channels in peripheral regions of the primary flow field.

21. The interconnect of claim 1, wherein the interconnect is externally manifolded for air.

* * * * *